United States Patent
Murano et al.

(10) Patent No.: US 10,090,691 B2
(45) Date of Patent: Oct. 2, 2018

(54) POWER GENERATION SYSTEM OF RENEWABLE-ENERGY-BASED ELECTRIC POWER GENERATOR AND DC POWER SOURCE COMBINER PROVIDED WITH REVERSE CURRENT PREVENTION DEVICE CAPABLE OF PREVENTING POWER LOSS IN POWER GENERATION SYSTEM

(71) Applicant: SION ELECTRIC CO., LTD., Hokkaido (JP)

(72) Inventors: Minoru Murano, Hokkaido (JP); Suminobu Akiba, Hokkaido (JP); Shin Tanahashi, Hokkaido (JP)

(73) Assignee: SION ELECTRIC CO., LTD., Hokkaido (JP)

( * ) Notice: Subject to any disclaimer, the term of this patent is extended or adjusted under 35 U.S.C. 154(b) by 119 days.

(21) Appl. No.: 15/111,613

(22) PCT Filed: Jan. 15, 2014

(86) PCT No.: PCT/JP2014/000162
§ 371 (c)(1),
(2) Date: Jul. 14, 2016

(87) PCT Pub. No.: WO2015/107563
PCT Pub. Date: Jul. 23, 2015

(65) Prior Publication Data
US 2016/0344212 A1  Nov. 24, 2016

(51) Int. Cl.
| H02J 1/00 | (2006.01) |
| H02J 3/00 | (2006.01) |
| H02J 7/00 | (2006.01) |
| H02J 3/38 | (2006.01) |
| H02J 3/50 | (2006.01) |
| H02J 1/10 | (2006.01) |

(52) U.S. Cl.
CPC ............ *H02J 7/0034* (2013.01); *H02J 1/108* (2013.01); *H02J 3/38* (2013.01); *H02J 3/383* (2013.01); *H02J 3/385* (2013.01); *H02J 3/50* (2013.01); *Y02E 10/58* (2013.01)

(58) Field of Classification Search
CPC .......... H02J 7/0034; H02J 3/385; H02J 1/108; H02J 3/383; H02J 3/50; H02J 3/38; Y02E 10/58
USPC ........................................................ 307/82
See application file for complete search history.

(56) References Cited

FOREIGN PATENT DOCUMENTS

| JP | 7-36556 | 2/1995 |
| JP | 10-84630 | 3/1998 |
| JP | 2000-23365 | 1/2000 |
| JP | 2001-275348 | 10/2001 |

(Continued)

*Primary Examiner* — Richard Tan
(74) *Attorney, Agent, or Firm* — Wenderoth, Lind & Ponack, L.L.P.

(57) ABSTRACT

Disclosed is a power generation system provided with a renewable-energy-based electric power generator, capable of efficiently and stably outputting electric power at a predetermined power amount. The power generation system includes at least an electric power generator and a maximum power amount detection control unit that performs control such that a voltage and a current at the maximum power point can be detected at any time to output the result as a detection value. The power supplied from a variable voltage power source is selected when the voltage is short. In contrast, the power supplied from a constant voltage power source is selected when the current is short.

3 Claims, 10 Drawing Sheets

(56) References Cited

FOREIGN PATENT DOCUMENTS

| | | |
|---|---|---|
| JP | 3149024 | 3/2009 |
| JP | 2011-36086 | 2/2011 |
| JP | 2011-172454 | 9/2011 |
| JP | 2012-75224 | 4/2012 |
| JP | 2013-158192 | 8/2013 |

POWER GENERATION SYSTEM OF RENEWABLE-ENERGY-BASED ELECTRIC POWER GENERATOR AND DC POWER SOURCE COMBINER PROVIDED WITH REVERSE CURRENT PREVENTION DEVICE CAPABLE OF PREVENTING POWER LOSS IN POWER GENERATION SYSTEM

TECHNICAL FIELD

The present invention relates to a power generation system having a renewable-energy-based electric power generator and a DC power source combiner provided with a reverse current prevention device and used in the power generation system, and more particularly, to a DC power source combiner provided with a reverse current prevention device capable of preventing a power loss, by which its output is stabilized at all times, and maximum power generation is achieved at the corresponding time point by efficiently using the amount of sunlight that changes depending on an environment such as a climate by combining different types of power sources in order to cope with a variation in the electric power, for example, in a sunlight photovoltaic power generation system (for example, the generated electric power increases under high brightness of sunlight, but it decreases in the dark).

BACKGROUND ART

A power output of an electric power generator based on renewable energy such as sunlight or wind is still unstable. In addition, it is known that its output state remarkably varies depending on an environmental condition. Therefore, it is desirable to stabilize the output power in the future.

Since such a renewable-energy-based electric power generator is regarded as being unsuitable for use as a stable power source, accumulation in a rechargeable battery was proposed. However, in this case, a power loss is generated in a charging/discharging operation disadvantageously.

In the renewable-energy-based electric power generator (such as a solar cell panel or a wind turbine), the output power varies depending on a current-voltage condition at the time of power output operation. Therefore, it is indispensable to perform control for outputting the electric power under an optimum condition.

Figure 3:
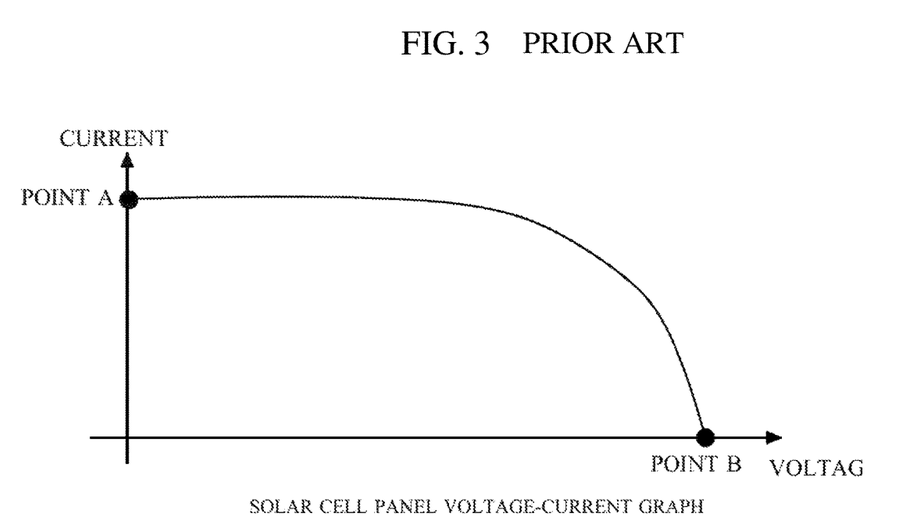
FIG. 3 is a graph (2) illustrating a current-voltage relationship caused by the electric power generator.

For example, if the output is short-circuited while a solar cell panel is laid under direct sunlight, the output current is maximized to 5.29 A (refer to a point A in FIG. 3). However, the voltage becomes zero (0 V). Therefore, the output power becomes zero (0 W).

In contrast, if the output is opened, the output voltage is maximized to 22.59 V (refer to a point B in FIG. 3). However, the current becomes zero (0 A). Similarly, in this case, the output power becomes zero (0 W)

Figure 2:
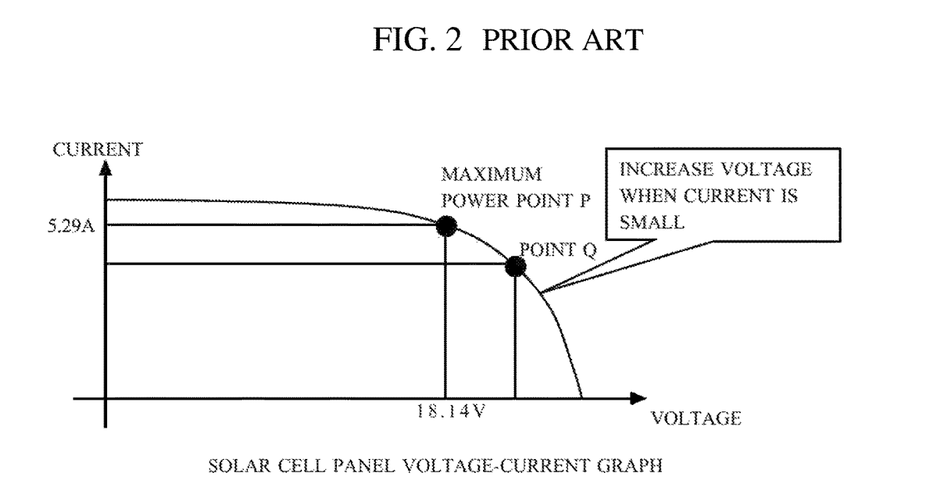
FIG. 2 is a graph (1) illustrating a current-voltage relationship caused by an electric power generator.

When the output voltage is at 18.14 V, the output current becomes 4.97 A (refer to a point P in FIG. 2). In this case, a maximum power of, approximately, 90 W can be output (maximum power point). Even in a lower or higher voltage, the output power is reduced. In order to output the maximum power, for example, a so-called maximum power point tracking (MPPT) technique has been applied to a lot of power conditioners (refer to FIG. 4).

Typically, it is known that, in an apparatus for combining a plurality of DC power sources of the related art, a so-called reverse current prevention circuit (a circuit for preventing a reverse current flow, such as a reverse current prevention diode) or a DC converter (such as a PWM chopper circuit) used to supply power to a DC load with a higher priority from a DC power source side may be installed solely or in combination.

In this regard, in the case of combining a plurality of power sources, when the power sources have different characteristics (such as an open circuit voltage), the current may flow between a plurality of power sources, and this may generate a failure.

Figure 8:
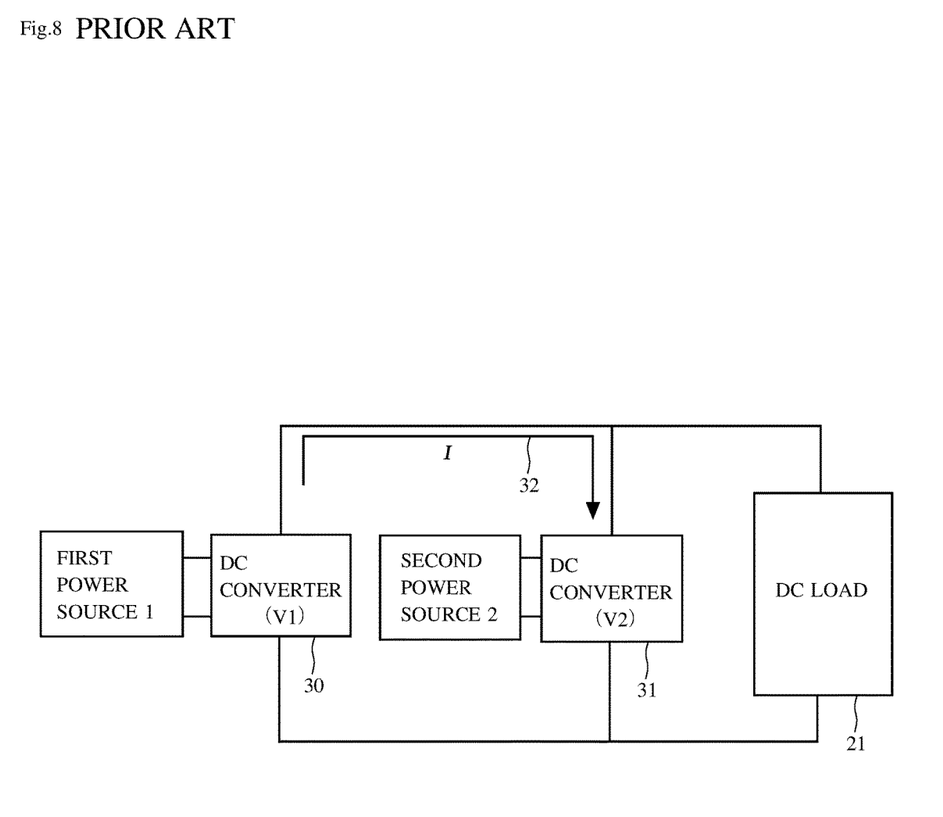
FIG. 8 is a block diagram (1) schematically illustrating a system of the related art.

For example, if the reverse current prevention circuit is not provided in the DC converters 30 and 31 as illustrated in FIG. 8, the output voltages V1 and V2 of the DC converters 30 and 31 have a relationship of "V1>V2," and a load resistance is high (for example, if no load is connected), the current may flow to the DC converter 31 side as indicated by the arrow 32, and this may generate a failure (refer to FIG. 8).

Figure 9:
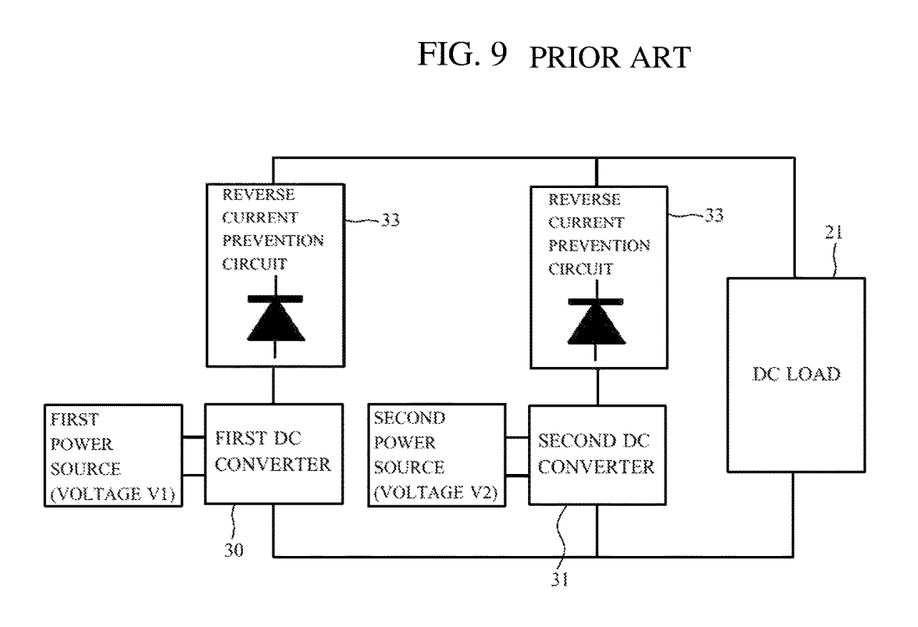
FIG. 9 is a block diagram (2) schematically illustrating a system of the related art.

In order to prevent such a failure, the reverse current is blocked by providing reverse current prevention circuits 33 (for example, reverse current prevention diodes) as illustrated in FIG. 9.

Inevitably, an electric power loss is generated by providing the reverse current prevention circuit 33 described above when the electric current flows through the reverse current prevention circuit 33. Assuming that a reverse current prevention diode is employed in the reverse current prevention circuit 33, for example, an electric power loss of 0.7 W may be generated for an electric current of 1 A due to a forward bias voltage of, approximately, 0.7 V in a typical diode.

CITATION LIST

Patent Literatures

Patent Literature 1: Japanese Patent Application Publication No. 2011-181055

SUMMARY OF INVENTION

The present invention has been made to address the aforementioned problems of the related art and improve the techniques of the related art through diligent efforts of the inventors. The invention provides a power generation system capable of directly using electric power generated by an electric power generator from renewable energy without voltage conversion or current conversion to prevent a loss in the electric power conversion of the electric power generator, outputting the electric power under a condition (voltage and current) where the maximum energy can be output from the electric power generator, stably outputting the electric power by combining other power sources, setting the electric power from the electric power generator with a highest priority ceaselessly while supplying only a deficiency from other power sources, that is, selecting a solar cell panel as the electric power generator while setting other power sources as a commercial power source. In this case, it is possible to reduce a power consumption of the commercial power sources as much as the electric power generated from the solar cell panel. In addition, the invention provides a DC power source combiner 29 provided with a reverse current prevention device without a power loss, capable of preventing a reverse current while the reverse current prevention circuits 33 are not provided in the DC converter 30 or 31 to remove or remarkably reduce a power loss that may be generated by the reverse current prevention circuit 33 (such as a reverse current prevention diode).

According to an aspect of the invention, there is provided a power generation system capable of stably outputting electric power, from an electric power generator configured to generate electric power from renewable energy of which generable electric power varies depending on a change of an environmental condition, to a load side at a predetermined power amount and efficiently outputting electric power by using renewable energy without wasting regardless of a change of an environmental condition, the power generation system including: at least an electric power generator configured to generate electric power from renewable energy of which generable electric power varies depending on a change of an environmental condition; and a maximum power amount detection control unit configured to perform control such that a maximum power point at which a power amount generated by the electric power generator from renewable energy reaches a maximum output power amount at a predetermined output time point regardless of a change of an environmental condition is detected at any time, voltage and current values at the maximum power point are detected at any time, and the generated power at the detected values is output, wherein, when the voltage value at the maximum power point detected by the maximum power amount detection control unit is lower than a voltage value of a predetermined power amount in the load side, a voltage value corresponding to the deficient power amount is supplied from a variable voltage power source, and when a current value at the maximum power point detected by the maximum power amount detection control unit is smaller than a current value of the predetermined power amount in the load side, a current value corresponding to the deficient power amount is supplied from the constant voltage power source.

According to another aspect of the invention, there is provided a DC power source combiner provided with a reverse current prevention device and configured to combine electric power from a plurality of DC power sources and output the combined electric power to a DC load without a loss, wherein each of the plurality of DC power sources has a DC converter capable of preventing a reverse current, the DC converter has a switch control circuit configured to set an electric power output to the DC load side to ON or OFF in the DC converter, a generated voltage value generated in the DC converter is compared with an output voltage value output to the DC load side, and the ON/OFF control of the switch control circuit is performed on the basis of a result of the comparison so that the switch control circuit serves as the reverse current prevention circuit.

In the DC power source combiner described above, which DC power source is used to supply electric power out of a combination of electric power from the plurality of DC power sources is determined on a priority basis.

In the power generation system having a renewable-energy-based electric power generator according to the present invention, the electric power generated from the electric power generator according to the present invention is directly used without performing voltage conversion or current conversion. Therefore, there is no loss in electric power conversion of the electric power generator. In addition, it is possible to output the electric power under a condition (voltage and current) where the maximum renewable energy can be output from the electric power generator. In addition, it is possible to stably output the electric power by combining the electric power generator with other power sources. In addition, it is possible to set the electric power from the electric power generator with a highest priority while only a deficiency is supplemented from other power sources. For example, a solar cell panel may be selected as the electric power generator, and other power sources may be selected as a commercial power source. In this case, it is possible to reduce a consumption of the electric power from the commercial power sources as much as the electric power generated from the solar cell panel.

It is possible to provide a DC power source combiner 29 provided with a reverse current prevention device capable of preventing a reverse current without providing the reverse current prevention circuits 33 in the DC converters 30 and 31, and capable of removing or remarkably reducing a power loss that may be generated by the reverse current prevention circuit 33 (such as a reverse current prevention diode).

That is, it is possible to prevent a reverse current using a DC converter control unit capable of combining a plurality of DC power sources without using a reverse current prevention circuit (such as a reverse current prevention diode) of the related art.

Furthermore, it is possible to remove a power loss generated by the reverse current prevention circuit because the reverse current prevention circuit is not used.

DESCRIPTION OF EMBODIMENTS

Embodiments according to the present invention will now be described with reference to the accompanying drawings.
Embodiment 1

Figure 1:
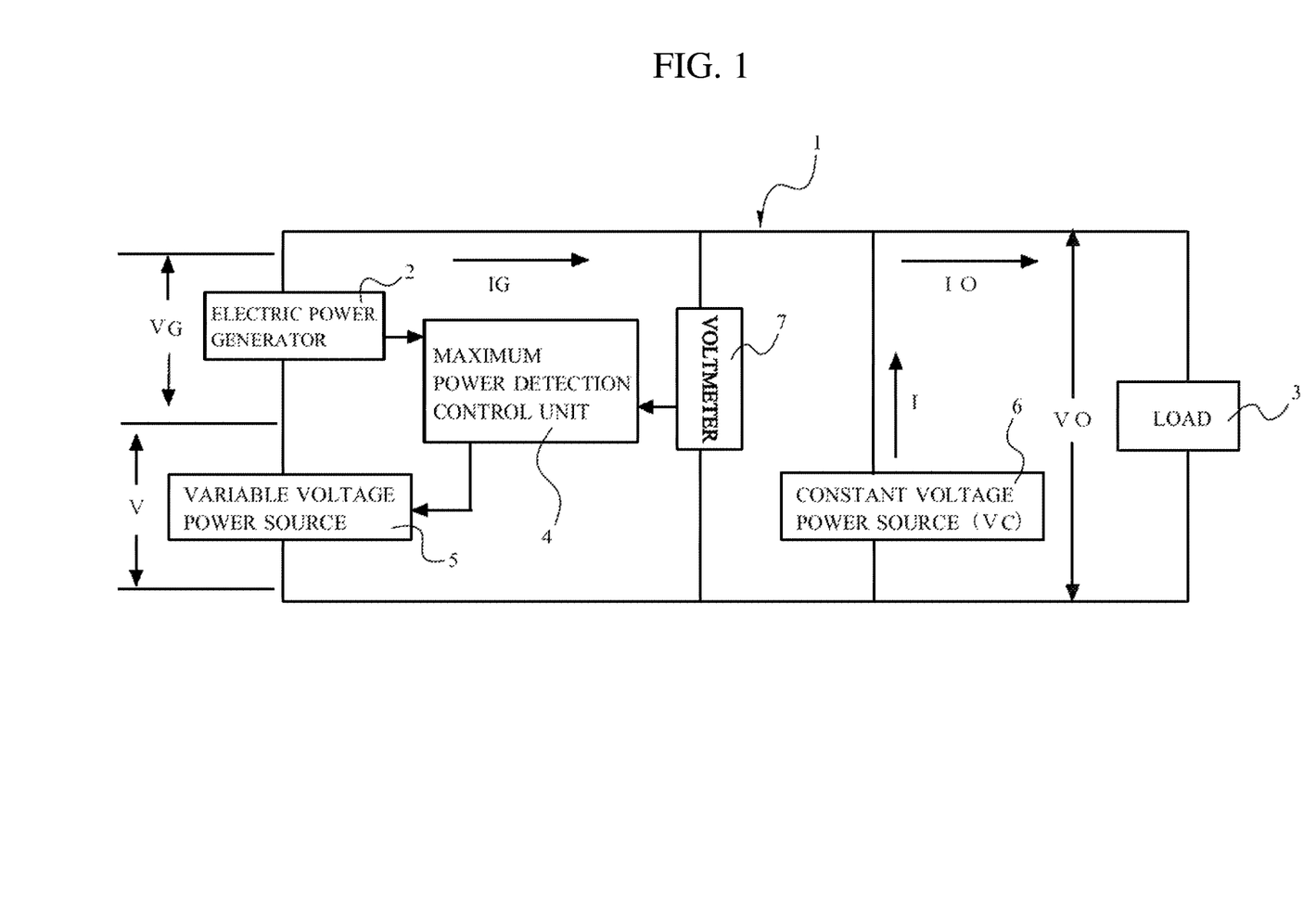
FIG. 1 is a block diagram schematically illustrating a configuration of a power generation system according to the present invention.

In FIG. 1, the reference numeral "1" denotes a power generation system according to the present invention. The power generation system 1 according to the present invention is a power generation system having a renewable-energy-based electric power generator 2 of which generated power varies depending on a change of an environmental condition, by which the electric power generated from the electric power generator 2 can be stably output to a load 3 side at a predetermined power amount, and the renewable energy can be used without wasting regardless of a change of an environmental condition to efficiently output the electric power.

This power generation system 1 has at least one renewable-energy-based electric power generator 2 of which generated power varies depending on a change of an environmental condition. Alternatively, a plurality of electric power generators 2 may also be connected in series.

The reference numeral "4" denotes a maximum power amount detection control unit generally embodied in a computer device and the like. The maximum power amount detection control unit 4 computes and detects, at any time, a maximum power point representing a maximum output power amount at a predetermined time point, in which the electric power amount generated by the electric power generator 2 can be output regardless of a change of an environmental condition.

Figure 4:
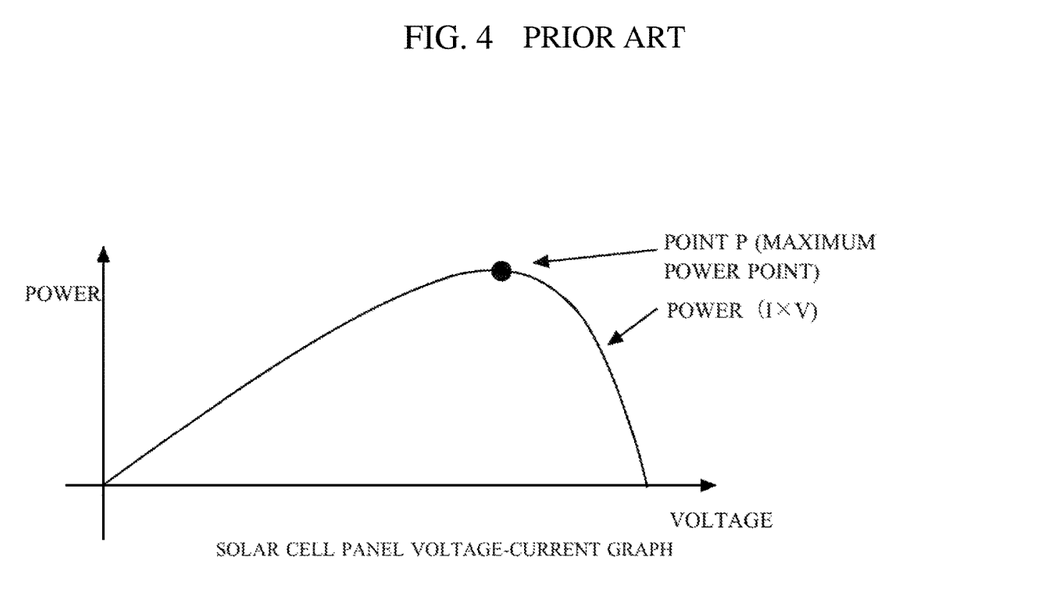
FIG. 4 is a graph illustrating a power-voltage relationship caused by the electric power generator.

In this detection, typically, a maximum power point tracking (MPPT) technique is employed, by which the maximum power point can be computed and detected using the maximum power amount detection control unit 4 such as a personal computer as described above. FIG. 4 is a diagram illustrating the maximum power point. In FIG. 4, the maximum power point is indicated by the point P.

The voltage and current values at this maximum power point, that is, the voltage and current values at the maximum power point that varies depending on a change of an environmental condition from time to time are detected continuously, and control is performed such that the generated power at the detected values can be output.

Next, in FIG. 1, the reference numeral "5" denotes a variable voltage power source, and the reference numeral "6" denotes a constant voltage power source.

In the electric power generator 2 described above, when the voltage value at the maximum power point detected by the maximum power amount detection control unit 4 is lower than the voltage value of the predetermined power amount of the load 3 side, a voltage value of the deficient electric power amount is supplied from the variable voltage power source 5. When the current value at the maximum power point detected by the maximum power amount detection control unit 4 is smaller than the current value of the predetermined power amount of the load 3 side, a current value of the deficient electric power amount is supplied from the constant voltage power source 6.

Specifically, for example, assuming that the electric power generator 2 is a solar cell panel (having an open circuit voltage of 22.59 V, a short-circuit current of 5.29 A, a maximum output operation voltage of 18.14 V, and a maximum output operation current of 4.97 A), and the output voltage VC of the constant voltage power source 6 is set to 25 V, the operation is performed as follows.

When the output current IO is equal to or larger than 5.29 A (IO≥5.29 A), the voltage of the variable voltage power source 5 is set to "25−18.14=6.86 V." If there is no load 3, the voltage of the solar cell panel becomes higher than 18.14 V (at maximum, 22.5 V). However, if there is the load 3, the current flows, and the voltage of the solar cell panel is reduced.

However, due to the constant voltage power source 6, the voltage is not reduced to the output voltage VC or the lower. For this reason, the voltage of the solar cell panel is maintained at 18.14 V, and the current IG of the solar cell panel at this time is 5.29 A, so that the maximum power point operation is achieved. In addition, the current I from the constant voltage power source 6 becomes "I=IO−IG," so that only the deficiency is supplemented from the constant voltage power source 6.

If the output current is smaller than 5.29 A, the current supplied from the solar cell panel is also reduced, and the output voltage of the solar cell panel increases (point Q in FIG. 2). Accordingly, the voltage of the variable voltage power source 5 is lowered (the voltage V is lowered until the voltage of the voltmeter 7 is equal to the output voltage VC (VO=VC)).

In this manner, the output voltage VO is determined depending on the voltage VC of the constant voltage power source 6. That is, "VO=VC" (where "VC>VP").

Here, the voltage VC of the constant voltage power source 6 is set by a user in advance depending on a use purpose, an environment, and the like.

For example, if a power supply of 100 V is necessary, the voltage VC is set to 100 V (VC=100 V). If a power supply of 25V is necessary, the voltage VC is set to 25 V (VC=25 V).

However, assuming that the voltage and the current at the maximum power point of the electric power generator 2 are denoted by "VP" and "IP," respectively, the output voltage and the output current are denoted by "VO" and "IO," respectively, and the voltage of the variable voltage power source 5 is denoted by "V," the voltage V is adjusted to satisfy the following relationships:

$$V=VO-VP \text{ (if IO} \geq \text{maximum output operation current)},$$

and $$V=VO-VG \text{ (if IO} < \text{maximum output operation current)}.$$

In the example described above, if the output voltage is set to 25 V (VO=25 V), this corresponds to a solar cell panel (having an open-circuit voltage of 22.59 V, a short-circuit current of 5.29 A, a maximum output operation voltage of 18.14 V, and a maximum output operation current of 4.97 A). Therefore, the voltage may be adjusted as follows:

(1) V=6.86 V (if the output current is set to "IO≥5.29 A"), and (2) V=VO−VP (if the output current is set to "IO<5.29 A").

Here, if the condition (1) is satisfied, the electric power generator 2 is operated at the maximum power point. At this time, out of the output current, a deficiency of the current of the electric power generator 2 is supplemented by the current I from the constant voltage power source 5.

If the condition (2) is satisfied, the current of the load 3 can be supplied with the current of the electric power generator 2.

As a method of obtaining the maximum power point, if the characteristics of the electric power generator 2 are known in advance, the maximum power point may be determined on the basis of a characteristic table. Alternatively, as described above, a hill-climbing method known as one of the typical MPPT methods may be employed. In this case, the voltage V may be adjusted to maximize a value of "VG×IG."

If the output current of the electric power generator is larger than the current IO, the constant voltage power source is not necessary.

As the variable voltage power source 4 or the constant voltage power source 5, the DC power may be obtained by converting commercial AC power.

Embodiment 2

Next, Embodiment 2 of the present invention will be described with reference to the accompanying drawings.

Figure 5:
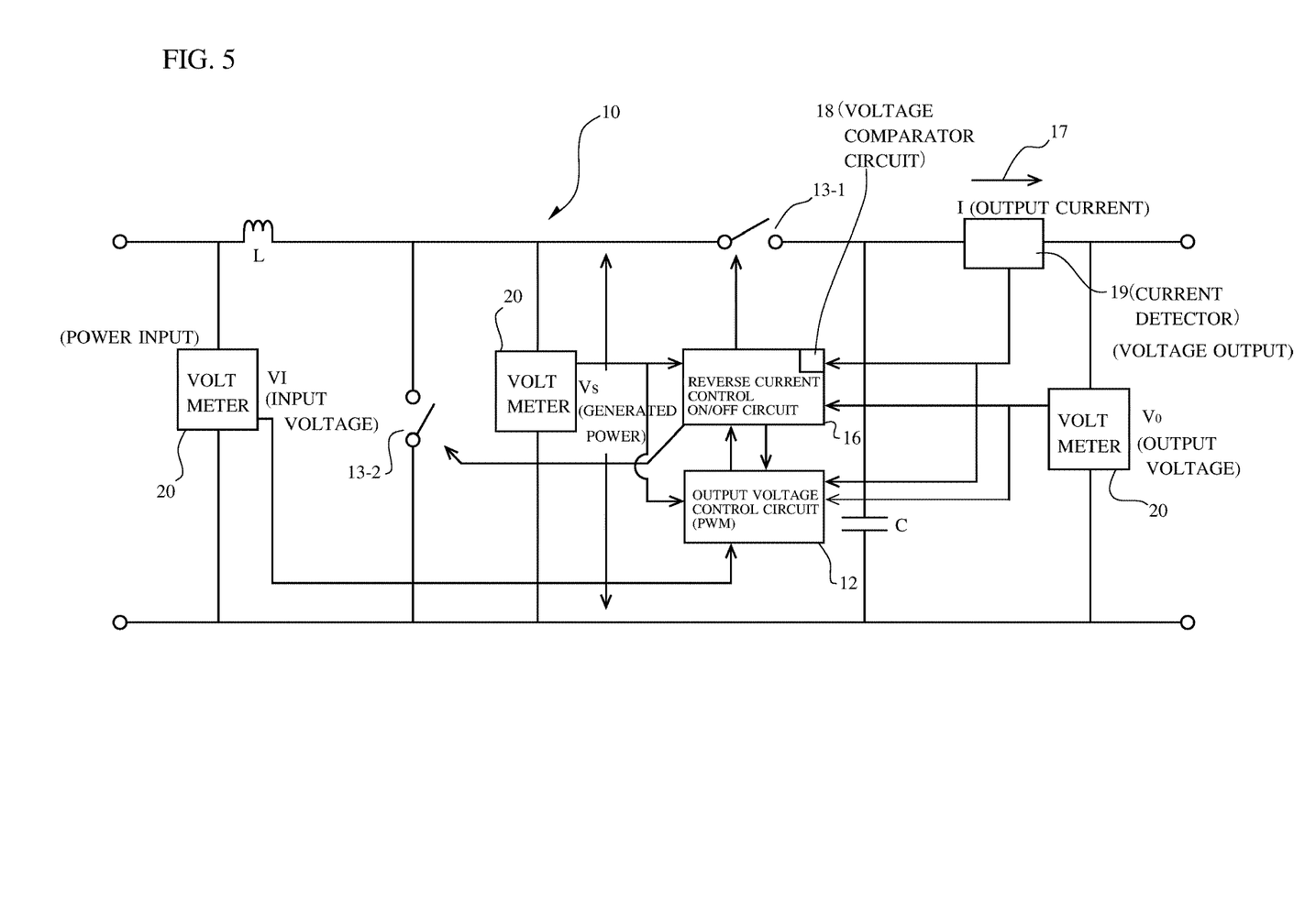
FIG. 5 is a block diagram schematically illustrating a DC converter according to the present invention.
Figure 6:
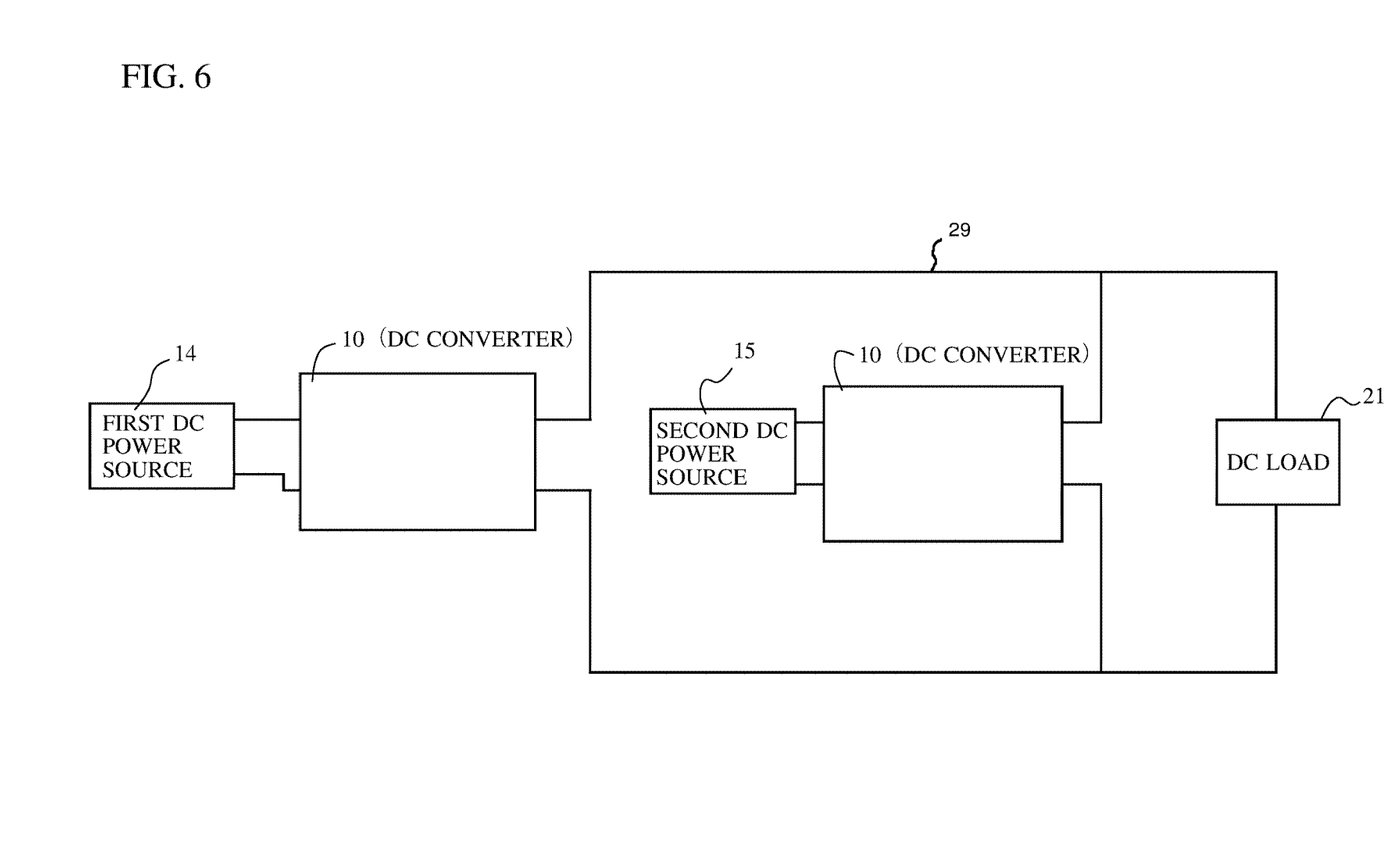
FIG. 6 is a block diagram schematically illustrating the entire system according to the present invention.

FIG. 5 is a block diagram schematically illustrating an embodiment of the present invention. In FIG. 5, the reference numeral "1" denotes a DC converter.

In the DC converter 100, an output voltage control circuit 2 for controlling the output voltage is provided. The output voltage control circuit 12 controls the voltage of the output side of the first DC power source 14 or the second DC power source 15, for example, by setting the switch circuit 13 to ON or OFF. In FIG. 5, the ON/OFF control of the switch circuit 13 is performed using a reverse current control ON/OFF circuit 16 described below to control the voltage of the output side of the first or second DC power source 14 or 15.

Therefore, it may be conceived that, by performing the ON/OFF control for the switch circuit 13, an ON/OFF function for preventing a reverse current is added to an existing circuit used to control the output voltage of the first or second DC power source 14 or 15.

In the reverse current control ON/OFF circuit 16, a generated voltage generated in the output voltage control circuit 12 and the output voltage are compared using a voltage comparator circuit 18, and the ON/OFF control of the switch circuit 13 is performed on the basis of the comparison result in order to prevent a reverse current, that is, such that the direction of the arrow 17 in FIG. 5 is not reversed. Note that the direction of this current may be monitored generally by checking a value of a detection system 19 such as an amperemeter.

In this Embodiment 2, focusing on a method for controlling the output voltage of the DC converter 100 in order to prevent an electric current from flowing between power sources (called "backfeeding"), this method is also employed in the reverse current prevention control. That is, a function of the reverse current prevention circuit is implemented by using the switch circuit 13 and the circuit that switches ON/OFF existing in the DC converter 100 such that the current does not flow reversely.

Here, the switch circuit 13 is a semiconductor switch (such as a transistor, a field effect transistor (FET), and an insulated-gate bipolar transistor (IGBT)). For example, the output voltage or the output current is controlled on the basis of a pulse width through a pulse width modulation (PWM) control technique.

The output voltage control circuit 12 is a circuit for generating a signal used in the ON/OFF control of the switch circuit 13 and controls the electric power flowing to the output on the basis of a pulse width or a pulse interval.

Here, the reference numeral "19" denotes a current detector (such as a shunt resistor or a current transformer). If the current detected by the current detector is reversed (opposite to the arrow direction 17 in FIG. 5), or if the voltage detected by the voltmeter 20 is compared using the voltage comparator circuit 18, and the output voltage VO is higher than the generated voltage Vs (VO>Vs), the switch circuit 13 is forcibly set to OFF. If the generated voltage Vs is higher than the output voltage VO, the ON/OFF control of the switch circuit 13 is returned to a normal control mode.

Figure 7:
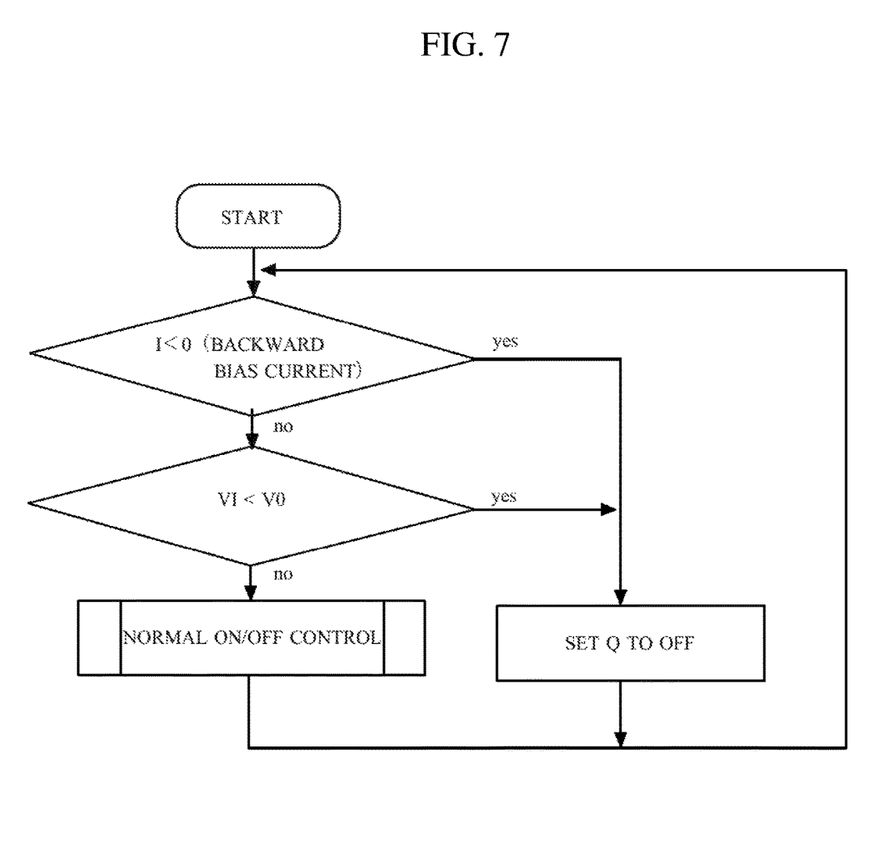
FIG. 7 is a flowchart illustrating operations according to the present invention.

As a result, it is possible to prevent a reverse current flow. An example of the processing will now be descried with reference to the flowchart of FIG. 7.

Next, operations of Embodiment 2 of the present invention will be described in detail.

<Cutoff of Reverse Current>

It is assumed that a reverse current flow directed oppositely to the arrow 17 in FIG. 5 is generated due to any voltage variation.

In this case, in the DC converter 100, a reverse current is detected by the current detector 19. As the reverse current is detected, the switch circuit 13 is cut off, and the current becomes zero. Therefore, a reverse current can be prevented by holding this state.

When the switch circuit 13 is set in ON, a current directed oppositely to the arrow 17 in FIG. 5 flows because the generated voltage VS is lower than the output voltage VO (VS<VO) in the DC converter 10. While this condition is satisfied, the switch circuit 13 is maintained in the OFF state. That is, since the DC converter 10 has a cutoff state, a reverse current can be prevented.

<Recovery from Reverse Current>

In the DC converter 10 of FIG. 5, if the condition "VS<VO" between the generated voltage VS and the output voltage VO is not satisfied, this means that a current does not flow in a direction opposite to the arrow 17 in FIG. 5 even when the switch circuit 13 is set in ON. In this case, it is possible to perform a normal control mode of the DC converter 10.

Here, a normal control mode of the DC converter 10, that is, the control of the output voltage may be performed using any configuration. For example, it is conceived that the switching period of the switch circuits 13-1 and 13-2 may be controlled using a so-called PWM technique to a constant voltage in order to maintain the output voltage VO at a constant level (note that a normal control mode of the DC converter 10 may be performed for the switch circuit 13-2 even when the switch circuit 13-1 is cut off).

As a result, it is possible to detect a reverse current state. Furthermore, under any condition in which a reverse current may flow, the switch circuit 13 is cut off to prevent the reverse current. In addition, only under a condition in which no reverse current flows, a normal control mode for the output voltage is performed in the DC converter 10. While the DC converter 10 has been described hereinbefore, such a description may similarly apply to the output voltage control circuit 12.

<Selection of Power Source>

On the basis of this principle, it is possible to select which power source is selected out of a plurality of power sources such as the DC power sources 14 and 15.

For example, assuming that a voltage range of the DC load 21 is set to 100 to 150 V, a target voltage of the DC converter 10 of the first DC power source 14 (referred to as a generated voltage "VS1") is set to 140 V, and a target voltage of the DC converter 10 of the second DC power source 5 (referred to as a generated voltage "VS2") is set to 120 V, the switch circuit 13 is set in ON when the load voltage is lower than a generated voltage in any DC converter 10. Therefore, the voltage of the load is equal to or higher than 120 V.

Here, if the electric power of the load is sufficiently supplied from the first DC power source 14, the electric power is supplied from the first DC power source 14, and the load voltage becomes 140 V. In this case, since the load voltage (140V) is higher than the generated voltage VS2 (120 V), the switch circuit 13 of the DC converter 10 of the second DC power source 15 is set to OFF. Therefore, the electric power is supplied only from the first DC power source 14.

If the electric power is not sufficiently supplied to the load only from the first DC power source 14, the load voltage is lowered. Here, if the load voltage is lower than 120 V, the load voltage becomes lower than the generated voltage VS2 (120V). Therefore, the switch circuit 13 of the DC converter 10 of the second DC power source 15 is set to ON, so that the electric power is supplied to the load from both the first and second DC power sources 14 and 15.

Distribution of the electric power to the first and second DC power sources 14 and 15 is determined on the basis of a power capacity and a voltage setting. While a voltage of 0 to 140 V is output to the first DC power source 14, a voltage of 0 to 120 V is set for the second DC power source 15. Therefore, an equilibrium state is achieved in the vicinity of 120 V so that a deficiency of the first DC power source 14 is supplemented from the second DC power source 15.

Meanwhile, for a voltage setting, if a high voltage (for example, 140 V) is set in the DC converter 10 of the second DC power source 15, and a low voltage (for example, 120 V) is set in the DC converter 10 of the first DC power source 14, similarly, the electric power is supplied from the second DC power source 15. If the electric power of the load is not sufficiently supplied only from the second DC power source 15, the electric power is supplied from both the first and second DC power sources 14 and 15.

Similar processing may be performed for a case where three or more DC power sources are provided, and a plurality of power sources may be selected on the basis of the voltage setting.

Figure 10:
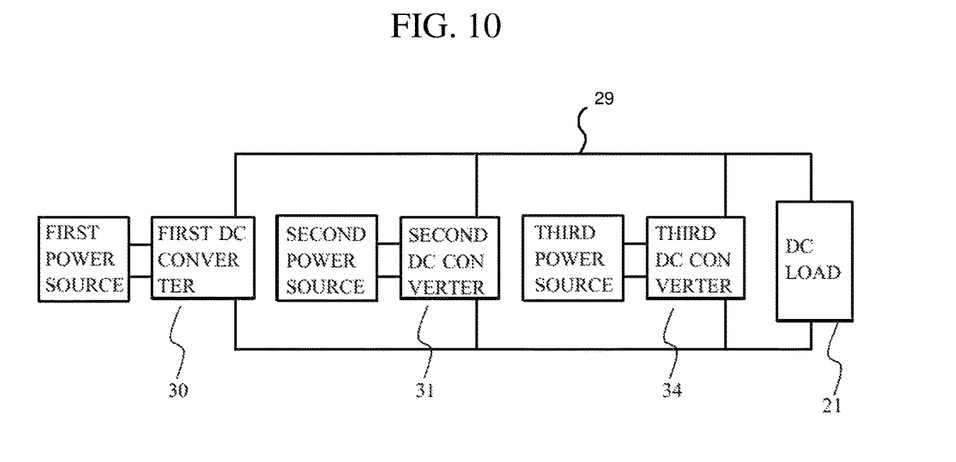
FIG. 10 is a block diagram schematically illustrating another embodiment according to the present invention.

For example, it is assumed that three DC power sources are connected as illustrated in FIG. 10, a voltage of the DC converter 30 is set to 120 V, a voltage of the DC converter 31 is set to 110 V, and a voltage of the DC converter 34 is set to 100 V. If the electric power is supplied from a combination of a first power source and a DC converter 30 of FIG. 10, which has nearly no load, the output voltage becomes 120 V, and no electric current flows from the DC converters 31 and 34.

If a current flowing to the load is large, and the electric power is not sufficiently supplied from the DC converter 30, the output voltage is lowered. When the output voltage is lowered to 110V, the electric power is also supplied from the DC converter 31. If the electric power is supplied to the load from the first and second power sources, the output voltage is set to 110 V. When the load is much larger, and the electric power is not sufficiently supplied from the first and second power sources, the output voltage is lowered. When the output voltage is lowered to 100V, the electric power is supplied from the third power source. In this manner, it is possible to determine a priority for supplying the electric power by setting the voltages even for three power sources.

The priority may be selected, for example, such that the highest voltage is set for the lowest cost power source, and the secondly highest voltage is set for the secondly lowest cost power source, and the lowest voltage is set for the highest cost power source. By setting the voltage level in this manner, it is possible to selectively supply electric power to any number of power sources on a cost basis.

Alternatively, an environment-based power source setting may be possible by setting the higher voltage to the smaller environmental load. Alternatively, the priority may also be set on the basis of the suppliable power amount.

Such settings may similarly apply to four or more power sources.

Note that, while the present invention has been described as a voltage boosting circuit in the aforementioned embodiment, a voltage dropping circuit may also be employed. By setting the target voltage as described above, it is possible to select a power source in the similar way.

REFERENCE SIGNS AND NUMERALS 1 power generation system
2 electric power generator
3 load
4 maximum power amount detection control unit
5 variable voltage power source
6 constant voltage power source
7 voltmeter
10 DC converter
12 output voltage control circuit
13 switch circuit
14 first DC power source
15 second DC power source
16 reverse current control ON/OFF circuit
17 arrow
18 voltage comparator circuit
19 current detector
20 voltmeter
21 DC load
29 DC power source combiner
30 DC converter
31 DC converter
32 arrow
33 reverse current prevention circuit
34 DC converter

The invention claimed is:

1. A power generation system capable of stably outputting electric power to a load side at a predetermined power amount and efficiently outputting electric power by using renewable energy without wasting regardless of a change of an environmental condition, the power generation system comprising:

at least one electric power generator configured to generate electric power from renewable energy of which generable electric power varies depending on a change of an environmental condition; and a maximum power amount detection control unit configured to perform control such that a maximum power point at which a power amount generated by the at least one electric power generator from renewable energy reaches a maximum output power amount at a predetermined output time point regardless of a change of an environmental condition is detected at any time value, voltage value and current value at the maximum power point detected at any time, and the generated power at the detected time value, voltage value and current value is output, wherein, when the voltage value at the maximum power point detected by the maximum power amount detection control unit is lower than a voltage value of a predetermined power amount in the load side, a voltage value corresponding to a deficient power amount is supplied from a variable voltage power source, and when a current value at the maximum power point detected by the maximum power amount detection control unit is smaller than a current value of the predetermined power amount in the load side, a current value corresponding to the deficient power amount is supplied from a constant voltage power source.

2. A DC power source combiner provided with a reverse current prevention circuit and configured to combine electric power from a plurality of DC power sources and output the combined electric power to a DC load without a loss, wherein each of the plurality of DC power sources has a DC converter capable of preventing a reverse current, the DC converter capable of preventing a reverse current has a switch control circuit configured to set an electric power output to a DC load side to ON or OFF in the DC converter, a generated voltage value generated in the DC converter is compared with an output voltage value output to the DC load side, and ON/OFF control of the switch control circuit is performed on the basis of a result of the comparison so that the switch control circuit serves as the reverse current prevention circuit.

3. The DC power source combiner according to claim 2, wherein which DC power source, of the plurality of DC power sources, that is used to supply electric power out of a combination of electric power from the plurality of DC power sources, is determined on a priority basis.

* * * * *